United States Patent
Masoomzadeh

(10) Patent No.: US 11,336,364 B1
(45) Date of Patent: May 17, 2022

(54) SYSTEM FOR LOW-LATENCY SATELLITE COMMUNICATION HANDOVER

(71) Applicant: AMAZON TECHNOLOGIES, INC., Seattle, WA (US)

(72) Inventor: Ali Masoomzadeh, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/847,060

(22) Filed: Apr. 13, 2020

(51) Int. Cl.
| | |
|---|---|
| *H04B 7/185* | (2006.01) |
| *H04W 36/00* | (2009.01) |
| *H04W 56/00* | (2009.01) |
| *H04W 64/00* | (2009.01) |

(52) U.S. Cl.
CPC ..... *H04B 7/18513* (2013.01); *H04B 7/18521* (2013.01); *H04B 7/18526* (2013.01); *H04W 36/0083* (2013.01); *H04W 56/001* (2013.01); *H04W 64/006* (2013.01)

(58) Field of Classification Search
None
See application file for complete search history.

(56) References Cited

U.S. PATENT DOCUMENTS

| | | | |
|---|---|---|---|
| 5,537,679 A | 7/1996 | Crosbie et al. | |
| 6,101,385 A | 8/2000 | Monte et al. | |
| 2006/0030311 A1 | 2/2006 | Cruz et al. | |
| 2008/0182572 A1* | 7/2008 | Tseytlin | H04B 7/18591 455/427 |
| 2014/0169185 A1 | 6/2014 | Masoomzadeh-Fard et al. | |
| 2016/0323800 A1 | 11/2016 | Ulupinar et al. | |
| 2017/0041830 A1* | 2/2017 | Davis | H04B 7/18521 |
| 2018/0026709 A1 | 1/2018 | Buer et al. | |
| 2018/0279249 A1* | 9/2018 | Lv | H04B 7/18545 |
| 2018/0359670 A1* | 12/2018 | Fang | H04W 36/385 |
| 2018/0376393 A1* | 12/2018 | Wu | H04B 7/18504 |
| 2019/0190591 A1* | 6/2019 | Wang | H04W 76/15 |

(Continued)

OTHER PUBLICATIONS

Chowdhury, et al., "Handover Schemes in Satellite Networks: State-of-the-Art and Future Research Directions", Telecom and Networks Research Lab School of Computer Sciences, University of Oklahoma, NASA Glenn Research Center, Satellite Networks & Architectures Branch, 13 pgs. Retrieved from the Internet: URL: https://www.cs.ou.edu/~netlab/Pub/SURV_HANDOFF_SN-ComSurveys.pdf.

(Continued)

*Primary Examiner* — Gregory B Sefcheck
*Assistant Examiner* — Amarnauth G Persaud
(74) *Attorney, Agent, or Firm* — Lindauer Law, PLLC

(57) ABSTRACT

Satellites provide communication between devices such as user terminals and gateways to other networks, such as the Internet. Non-geosynchronous orbit satellites move relative to terrestrial user terminals, passing in and out of communication over time. To maintain ongoing communication, a handover takes place in which the responsibility to maintain communication with a particular user terminal passes from one satellite to another. To minimize disruption due to the handover, satellite motion and availability of communication resources are allocated in advance. Participating devices such as the user terminal, current satellite, and next satellite, are provided with details of the handover in advance. As a result, interruption in communication due to a handover from one satellite to another is substantially reduced.

20 Claims, 4 Drawing Sheets

(56) References Cited

U.S. PATENT DOCUMENTS

2020/0204250 A1* 6/2020 Ravishankar ... H04W 36/00837
2020/0204254 A1* 6/2020 Wang .................... H04B 10/69

OTHER PUBLICATIONS

Gang, et al., "A Handover Strategy in the LEO Satellite-Based Constellation Networks with ISLs", School of Communication and Information Engineering, UESTC, Journal of Electronic Science and Technology of China vol. 1, Issue , Dec. 2003, 7 pgs. Retrieved from the Internet: URL:https://pdfs.semanticscholar.org/8565/4da892017566ae1935962e8913c1473111f7.pdf.

Doan, Phuoc Huu, "Notice of Allowance dated Aug. 24, 2021", U.S. Appl. No. 16/886,359, The United States Patent and Trademark Office, dated Aug. 24, 2021.

* cited by examiner

400

HANDOVER DATA 164

| PARAMETER 402 | VALUE 404 |
|---|---|
| UT IDENTIFIER | 568451 |
| NEXT SAT ID | 3021 |
| HANDOVER TIME | 2210 |
| RESOURCE PRIORITY | 125 |
| ... | ... |

GRANT DATA 166

| PARAMETER 402 | VALUE 404 |
|---|---|
| UT IDENTIFIER | 568451 |
| NEXT SAT ID | 3021 |
| HANDOVER TIME | 2210 |
| UL/DL FREQUENCIES | 15.250 / 45.105 |
| TIMESLOT | 497 |
| GRANT EXPIRATION TIME | 2832 |
| ... | ... |

TRACKING DATA 184

| PARAMETER 402 | VALUE 404 |
|---|---|
| CURRENT LOCATION (OF UT) | 31.05, -98.48 |
| HANDOVER TIME | 3021 |
| AZIMUTH/ELEVATION | 176/34 |
| TOF CORRECTION | +509 NS |
| ... | ... |

LINK DATA 192

| PARAMETER 402 | VALUE 404 |
|---|---|
| UT IDENTIFIER | 568451 |
| LAST SEQUENCE NUMBER | 10335 |
| ... | ... |

FIG. 4

SYSTEM FOR LOW-LATENCY SATELLITE COMMUNICATION HANDOVER

BACKGROUND

Satellites in non-geosynchronous orbits (NGO) move relative to a body they are orbiting, such as the Earth. A device that is using these satellites for communication services will see a given satellite moving into and out of view in relatively short periods of time, such as within minutes. If ongoing communication service is provided, the communication service needs to be transitioned from using one satellite moving out of view to another that is moving into view.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 4 illustrates data associated with operation of the system, according to some implementations.

Figure 1:
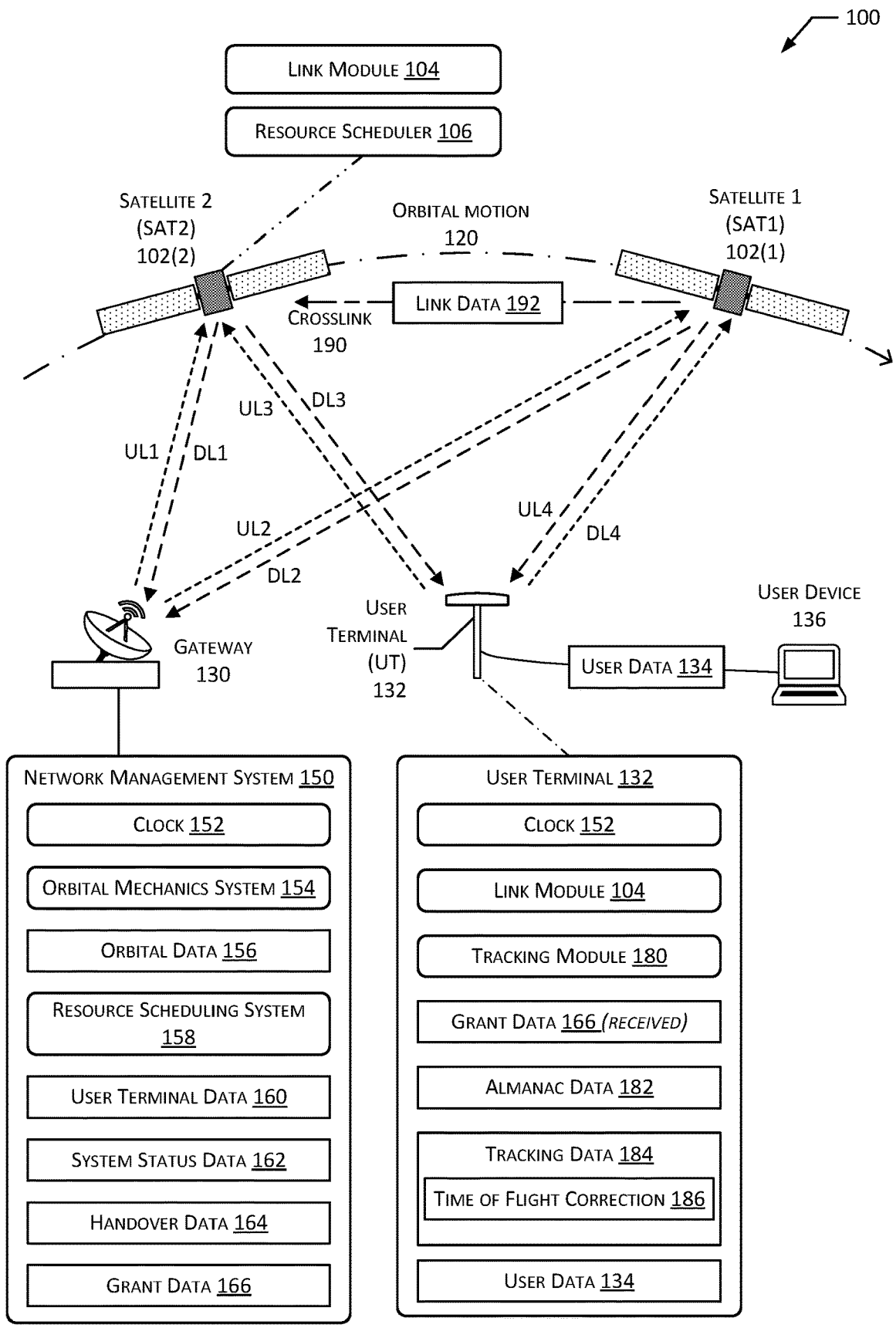
FIG. 1 illustrates a system that uses preassigned grants to provide low latency handover of communication services for a user terminal from a first satellite to a second satellite, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

Non-geosynchronous orbit (NGO) satellites move relative to a body such as the Earth, Moon, Mars, and so forth. These NGOs may be part of a network to provide communication services between devices, such as user terminals (UT) located on or near the body. For example, a first UT on a first geographic location (geolocation) on the Earth may send user data to a first satellite that is in range of the first UT. The first satellite may send the user data to a gateway that is part of a ground station, another satellite, and so forth. Likewise, data destined for the first UT may be sent by the gateway to the first satellite, which then sends the data to the first UT. For ease of illustration, and not necessarily as a limitation, a satellite may be deemed "in range" of a UT when communication may take place. For example, a satellite may be in range when it is within line of sight of the UT, a distance between the satellite and the UT is less than a threshold distance, the UT is within a footprint of an antenna onboard the satellite, and so forth.

A period, or duration, of an orbit varies depending upon the altitude of the satellite with respect to the body, eccentricity of the orbit, and so forth. For example, a satellite at an altitude of 600 kilometers (km) will take approximately 96 minutes to complete a circular orbit around the Earth. Depending on a variety of factors including the curvature of the Earth, a satellite may be in range of a particular UT for only a few minutes. In comparison, a geosynchronous satellite has an orbital period that coincides with the rotation of the earth, so a geosynchronous satellite appears to remain motionless with respect to the earth.

Signals between the UT and the satellite are limited to travelling at the speed of light. The farther away a satellite is from the UT, the longer it takes for a signal to travel to the satellite and then travel back to earth. For example, a hop (sending a signal to the satellite and back down to the ground, or vice versa) to a geosynchronous satellite introduces a delay of at least 240 milliseconds (ms). Additional delays due to signal processing, buffering, and so forth may also be present. Such delays, or latency, are undesirable for many types of communication. For example, a real-time voice call in which there is a ¼ second delay can be aggravating. Likewise, time-sensitive communication activities such as remote control of devices, industrial reporting and control, gaming, and so forth may be adversely affected by these latencies. In comparison, a hop involving an NGO satellite at an altitude of 600 km only introduces about 4 ms of latency. As a result, compared to using geosynchronous satellites, the use of NGO satellites significantly reduces latencies due to signal travel times.

Several factors limit the use, number, and placement of geosynchronous satellites. Orbital dynamics, fuel consumption required to keep a satellite in a particular orbit, radio propagation characteristics, and so forth result in a finite number of geosynchronous orbital "slots". Given these limitations and the increasing demand for communication services, geosynchronous satellites are unable to satisfy the increasing demands of communication services.

Using a constellation of many NGO satellites offers significant benefits. Latency is dramatically reduced, improving usefulness for communication. Shorter distances between the UT and the satellite allows for increased UT density by allowing greater frequency re-use and sharing. Power and antenna gain requirements for both the UT and the satellites are also reduced due to the shorter distances, compared to communication using geosynchronous satellites. This allows for relatively smaller and less expensive satellites to be used.

However, as mentioned above, due to the lower orbits, the NGO satellites are moving quickly with respect to a terrestrial UT that is fixed, or on a relatively slow moving craft such as a car, boat, aerostat, drone, airplane, and so forth. With a satellite passing in and out of view every few minutes, to provide ongoing communication a handover operation is needed to facilitate the transfer of responsibility for providing communication services for a UT from one satellite to another.

Traditionally such a handover has introduced significant delays. For example, as one or more metrics associated with communication to a first satellite such as signal strength drops below a threshold level, the UT may try to establish communication with a second satellite. However, the protocols associated with such an ad hoc transition may result in delays exceeding several seconds while communication is established with the second satellite. Additionally, such techniques are inefficient. For example, the extended handover delays prevent the satellite from using that time to transfer user data, reducing overall utilization of the satellite. The extended handover may also result in duplicative data transfer in which the first satellite and the second satellite each transfer the same data during the extended handover period. This duplication reduces the overall efficiency of the entire system.

Described in this disclosure is a system and associated techniques for using that system to provide low latency handover of communication services for a UT from one satellite to another. An NGO constellation comprises a plurality of satellites in orbit. These satellites may communicate with one or more of each other, a gateway or ground station, and so forth. Communication services provided by the satellites and the gateways allow the UTs to send and receive user data to one another or to another network such as the internet.

A network management system uses an orbital mechanics system to determine orbital data that is indicative of a state of a particular satellite at a specified time. For example, the orbital mechanics system may use orbital elements that represent characteristics of the orbit of the satellites in the constellation to determine orbital data that predicts location, velocity, and so forth of a particular satellite at a particular time. Other data such as scheduled maneuvers may also be considered in the determination of the orbital data.

A resource scheduling system uses information such as the orbital data, user terminal data, and system status data to determine handover data. The user terminal data provides information about the geolocation of a UT. The system status data may comprise information such as which UTs are currently transferring traffic, the respective satellites used, capacity available at the gateways, and so forth.

The resource scheduling system may determine handover data at regular intervals. For example, handover data may be generated for handover assessment intervals that are five seconds long. In other implementations, the handover data may be determined on demand, at irregular intervals, and so forth.

Using the orbital data and the user terminal data, the resource scheduling system is able to determine which satellites will be in and out of range of the UT during a time interval in the future. The resource scheduling system may then use the system status data to determine handover data for those UTs requiring a handover due to a satellite moving out of range, system capacity issues, and so forth.

The handover data provides information to a first satellite that is currently providing communication service to a first UT as to when a handover in communication service to a second satellite will take place and information about the second satellite. For example, the handover data may include a UT identifier indicative of a particular UT, a next satellite identifier indicative of the second satellite, handover time, and so forth.

The handover data may also be provided to the second satellite. The first and second satellites may use the handover data to control when to discontinue communications services to a particular UT, when to provide communication services to a particular UT, and so forth.

Grant data may be generated that is indicative of one or more parameters associated with communication between the first UT and the second satellite at the handover time. For example, the grant data may indicate the next satellite identifier, the handover time, uplink frequency, downlink frequency, assigned timeslot, and forth. The grant data may be generated by one or more of the network management system or the second satellite. For example, the second satellite may manage its onboard resources based on handover data that it has received.

The grant data may be provided to the second satellite and the first UT. The first satellite, second satellite, and the first UT now have the information needed to coordinate and provide a low latency handover of communication services from the first satellite to the second satellite. As the appointed handover time approaches, the first satellite sends link data to the second satellite. For example, the link data may indicate a sequence number of a last frame successfully transmitted from the first satellite to the first UT before the handover time. The second satellite may then use this information to determine what information has been received by the first UT and avoid sending duplicative data.

Before the handover time, the first UT may receive almanac data indicative of orbital elements of the orbit of the second satellite. For example, the almanac data may comprise two-line elements for the satellites in the constellation. A tracking module in the first UT uses the almanac data and the grant data to determine tracking data for the second satellite, as indicated in the grant data. The tracking data may comprise a time of flight correction. For example, using the next satellite identifier from the grant data, the two line elements are retrieved from the almanac data. Geolocation of the first UT is used with the almanac data to determine tracking data indicative of azimuth, elevation, distance to the second satellite, and so forth. This determination may be ongoing. For example, the first UT may determine tracking data every second. The time of flight correction is based at least in part on the propagation time of signals between the first UT and the second satellite. For example, as the second satellite's position changes over time, the distance between the first UT and the second satellite changes, changing the amount of time it takes for a signal to travel between the first UT and the second satellite.

At or before the handover time, the first UT receives a time synchronization signal from the second satellite. The first UT, using the grant data and previously acquired almanac data, has determined the tracking data in advance, including the time of flight correction. A link module of the first UT uses the time synchronization signal and the time of flight correction to coordinate timing of communication between the first UT and the second satellite. For example, as the second satellite moves closer to the UT, signals sent at later times will reach the second satellite slightly sooner than expected. These changes in time of flight can introduce timing errors that can adversely affect communication performance. The first UT may use the time of flight correction to determine a time offset value. The time offset value specifies how much the transmit timing of signals to the second satellite should be advanced or delayed such that the signals arrive at the second satellite within a threshold interval of a desired time onboard the second satellite. For example, the first UT adjusts when it transmits a first signal based on the time offset value and the time synchronization signal.

From the perspective of the satellites in the constellation, each satellite is receiving signals from UTs in which the timing is tightly coordinated to, and synchronized with, the internal clock of the satellite. This allows greater utilization of the communication link by reducing the time between transmission of frames, providing more time for transmitting user data. By performing the time offset at the UT, the processing workload of the second satellite is substantially reduced. This reduces the cost and complexity of the satellite, reducing overall system cost.

By having the grant data in advance, the first UT is ready before the handover time for the handover operation. Instead of a lengthy protocol to establish communication service, the system as described in this disclosure allows the second satellite to quickly establish communication services to the first UT. At the appointed handover time, the second satellite has allocated resources to handle the communication service to the first UT. Likewise, the first UT knows when to discontinue communication service with the first satellite and switch to using the second satellite to provide communication service. Because the grant data provides in advance the details about the communication link, negotiation for communication parameters between the second satellite and the first UT is significantly reduced or eliminated altogether. As a result, communication with the second satellite is rapidly established. For example, an interruption of less than 20 milliseconds may be experienced during a handover. This provides a substantial decrease in latency due to handovers.

Overall efficiency of the system in transferring user data is also substantially improved by using the system and techniques described here. For example, the reduced time spent establishing communication between the UT and the second satellite allows more time for user data to be sent.

The system is able to provide the decrease in latency due to handovers without the use of extensive hardware at the first UT. For example, the first UT is able to use a single antenna array and a single transceiver. In comparison, other systems may use dual antennas and dual transceivers operating to establish communication with the next satellite before discontinuing communication with the current satellite. While this may reduce the latency due to a handover, it significantly increases the complexity and cost of the UT.

By using the system and techniques described in this disclosure, a constellation of NGO satellites is able to provide very low latency handovers of communications between satellites in the constellation. This allows a cost-effective UT to provide ongoing low latency communication service to an end user.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals, such as radio waves or light to send information over a distance. These electromagnetic signals have a maximum speed in vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light from a laser will spread out at progressively larger distances.

As height above ground increases, the area on the ground that is visible from that elevated point increases. For example, the higher you go in a building or on a mountain, the farther you can see. The same is true for the electromagnetic signals used to provide communication services. A relay station having a radio receiver and transmitter with their antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period or time it takes for a satellite to complete a single orbit. A satellite in a geosynchronous orbit at an altitude of 35,800 km may appear to be fixed with respect to the ground because the period of that the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites are limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication services also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the satellite at 600 km only introduces 4 ms of latency for a single hop. The lower altitude also reduces the distance the electromagnetic signal has to travel. Compared to the geosynchronous orbit, the reduced distance of the NGO reduces the dispersion of electromagnetic signals. This allows the satellite in NGO as well as the device communicating with the satellite to use a less powerful transmitter, use smaller antennas, and so forth.

The system 100 shown here comprises a plurality (or "constellation") of satellites 102(1), 102(2), . . . , 102(S) that are each in non-geosynchronous orbits (NGOs). The constellation may comprise hundreds or thousands of satellites 102. These satellites 102 may be arranged in different orbits. Some of these orbits may be at different altitudes. The satellites 102 in orbit are in constant motion with respect to the Earth. In this illustration, orbital motion 120 is depicted with an arc pointed to the right. A first satellite (SAT1) 102(1) is leading (ahead of) a second satellite (SAT2) 102(2).

Each satellite 102 may include a link module 104 and resource scheduler 106. The link module 104 is used to establish communication with other devices. The link module 104 may include one or more transmitters, receivers, antennas, digital signal processors, and so forth. The resource scheduler 106 may comprise one or more processors executing instructions to manage the link module 104 and maintain communication services such as a radio communication link with other devices.

One or more gateways 130 are in communication with one or more satellites 102 and pass data between the satellites and other networks, such as the Internet. Each gateway 130 may comprise a ground station with one or more receivers, transmitters, antennas, routers, and so forth.

User terminals (UTs) 132 may comprise one or more transmitters, receivers, antennas, digital signal processors, processors, and so forth. The UT 132 passes user data 134 between the constellation of satellites 102 and a user device 136. The user data 134 includes data originated by the user device 136 or addressed to the user device 136. The UT 132 may be fixed, or used on a slow moving craft (relative to the satellite 102), such as a car, boat, aerostat, drone, airplane, and so forth. The UT 132 is described in more detail below.

A network management system 150 is in communication with one or more gateways 130 and, via those gateways 130, the satellites 102 and the UTs 132. The network management system 150 coordinates operation of the satellites 102, gateways 130, UTs 132, and other resources of the system 100.

A clock 152 provides timing data for the network management system 150. In some implementations the clock 152 may be a global positioning system (GPS) disciplined clock or an atomic clock that provides a high accuracy and high precision time source. Output from the clock 152 may be used to coordinate operation of the system 100.

An orbital mechanics system 154 determines orbital data that is indicative of a state of a particular satellite at a specified time. The orbital mechanics system 154 may comprise one or more computing devices. In one implementation, the orbital mechanics system may use orbital elements that represent characteristics of the orbit of the satellites 102 in the constellation to determine orbital data 156 that predicts location, velocity, and so forth of particular satellites 102 at particular times or time intervals. For example, the orbital mechanics system 154 may use data obtained from actual observations from tracking stations, data from the satellites 102, scheduled maneuvers, and so forth to determine the orbital elements. The orbital mechanics system 154 may also consider other data, such as space weather, collision mitigation, orbital elements of known debris, and so forth.

The network management system 150 includes a resource scheduling system 158. The resource scheduling system 150 uses information such as the orbital data 156, user terminal data 160, system status data 162, and so forth to determine handover data 164.

The user terminal data 160 may comprise information such a geographic location (geolocation) of a particular UT 132. The user terminal data 160 may also include other information such as a priority assigned to user data 134 associated with that UT 132, information about the communication capabilities of that particular UT 132, and so forth. For example, a particular UT 132 in use by a rural hospital may be assigned a higher priority relative to a UT 132 operated in a residential setting. Over time, different versions of UTs 132 may be deployed, having different communication capabilities such as being able to operate at particular frequencies, supporting different signal encoding schemes, having different antenna configurations, and so forth.

The system status data 162 may comprise information such as which UTs 132 are currently transferring data, satellite availability, current satellites 102 in use by respective UTs 132, capacity available at particular gateways 130, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, due to maneuvering, and so forth. The system status data 162 may be indicative of past status, predictions of future status, and so forth. For example, the system status data 162 may include information such as projected data traffic for a specified interval of time based on previous transfers of user data 132. In another example, the system status data 162 may be indicative of future status, such as a satellite 102 being unavailable to provide communication service due to scheduled maneuvering, scheduled maintenance, scheduled decommissioning, and so forth.

The handover data 164 is indicative of information such as a UT identifier indicative of a particular UT 132, a handover time indicative of when a handover is to occur, a next satellite identifier (ID) that is indicative of the next satellite 102 that will be providing communication service to the specified UT 132, and so forth.

The resource scheduling system 158 may determine handover data 164 at regular intervals. For example, handover data 164 may be generated for handover assessment intervals that are five seconds long. In other implementations, the handover data 164 may be determined on demand, at irregular intervals, and so forth.

In one implementation, the handover data 164 may involve the resource scheduling system 158 using the orbital data 156 and the geolocation of the UTs 132 to determine which UTs 132 will be moving out of range of the satellites 102 currently providing communication services to those UTs 132. Based on the orbital data 156 and the geolocation of each UT 132, the next satellite 102 may be determined. For example, this may be a satellite 102 that is already in range, or will be in range, at the handover time. In some implementations the handover data 164 may include a set of next satellites. For example, the handover data 164 may comprise a set of satellite IDs that indicate a primary satellite and a secondary satellite. Continuing the example, the second satellite 102(2) may be designated as the primary satellite expected to begin providing communication service to the UT 132 at the handover time. In the event the satellite 102(2) is unable to allocate resources to provide communication service to the UT 132, exception data indicative of this may be generated and provided to one or more of the network management system 150, the secondary satellite 102(3), the UT 132, or other devices. For example, the second satellite 102(2) may use a crosslink 190 to send the exception data to the first satellite 102(1) and the secondary satellite 102(3). The first satellite 102(1) may send the exception data to the UT 132. The secondary satellite 102(3) may then allocate resources to provide communication service to the UT 132, and may subsequently provide the communication service beginning at the handover time.

Grant data 166 may be generated that is indicative of one or more parameters associated with communication between the UT 132 and the next satellite 102 that is scheduled to begin at the handover time. For example, the grant data 166 may indicate the next satellite identifier, the handover time, uplink frequency, downlink frequency, assigned timeslot, signal encoding, and forth. The grant data 166 may be generated by one or more of the network management system 150 or a satellite 102. For example, the second satellite 102(2) that is designated to provide communication service starting at the handover time may use its resource scheduler 106 to determine the grant data 166. The grant data 166 is provided to the UT 132. For example, the grant data 166 may be sent from the second satellite 102(2) to the first satellite 102(1) which then sends the grant data 166 to the UT 132 using a crosslink 190 that allows for intersatellite communication. In another example, the grant data 166 is sent from the second satellite 102(2) to a gateway 130, and the same or another gateway 130 may send the grant data 166 to the first satellite 102(1) which then sends the grant data 166 to the UT 132. In other implementations the grant data 166 may be generated by the network management system 150 and sent to the second satellite 102(2) and the UT 132. The UT 132 includes a clock 152. For example, the clock 152 may comprise a GPS disciplined clock. The UT 132 includes a link module 104 to establish communication with the satellites 102.

Before the handover time, the first UT 132 receives almanac data indicative of orbital elements of the orbit of the second satellite 102(2). In one implementation, the grant data 166 may include the orbital elements for the designated next satellite 102. In another implementation, almanac data comprising orbital elements such as "two-line element" data for the satellites 102 in the constellation may be broadcast or otherwise sent to the UTs 132.

A tracking module 180 uses the current geolocation of the UT 132, the grant data 166, and the almanac data 182 to determine tracking data 184 for the next satellite 102 to provide communication service at the handover time. For example, based on the current geolocation of the UT 132 and the predicted position and movement of the satellites 102, the tracking module 180 is able to calculate the tracking data 184. The tracking data 184 may include information indicative of azimuth, elevation, distance to the second satellite, time of flight correction 186, or other information at a specified time. The determination of the tracking data 184 may be ongoing. For example, the first UT 132 may determine tracking data 184 every 100 ms, every second, every five seconds, or at other intervals.

The time of flight correction 186 is based at least in part on the propagation time of signals between the first UT 132 and the second satellite 102(2) that will be providing communication service beginning at the handover time. For example, as the second satellite's 102(2) position changes over time, the distance between the second satellite 102(2) and the first UT 132 changes. Because the electromagnetic signal has a maximum speed of "c", as the distance changes so too does the amount of time it takes for a signal to travel between the first UT 132 and the second satellite 102(2). In one implementation, the time of flight correction 186 may be determined by dividing the distance by c. In other implementations other factors may be considered, such as the portion of the distance that passes through the atmosphere, maximum time error that still allows communication, relativistic effects, and so forth. As described below in more detail, the time of flight correction 186 may be used to determine a time offset. The UT 132 may use the time offset to change when a signal is sent to the satellite 102 so that, when the signal is received, it is received within a particular window of time as measured by a clock onboard the satellite 102.

The distance between the UT 132 and the estimated location of the second satellite 102(2) at the handover time may be calculated given the known geolocation of the UT 132 and the almanac data 182. For example, a predicted position of the satellite 102(2) may be calculated at the specified handover time using the almanac data 182. The distance may then be calculated based on the known geolocation and the predicted position of the satellite 102(2). The distance "D" may also be known as the "slant range". The distance may be calculated using the following equations:

$$r = h + B \qquad \text{EQUATION 1}$$

where r=distance between the geocenter of Earth and the satellite and

B is a distance between the geocenter and the UT 132

$$D = \sqrt{(B \cdot \cos(\epsilon))^2 + r^2 - B^2} - B \cdot \cos(\epsilon)$$ where $\epsilon$ is an elevation angle to the satellite relative to local vertical $\qquad \text{EQUATION 2}$ Once grant data 166 has been determined and provided to the UT 132, before the handover time the first satellite 102(1) that is currently providing communication service may send link data 192 to the second satellite 102(2). For example, the first satellite 102(1) may use the crosslink 190 to send the link data 192 to the second satellite 102(2). The link data 192 may comprise a sequence number of a last frame of user data 134 that was successfully transmitted from the first satellite 102(1) to the UT 132 before the handover time. For example, during data transmission, each frame of data during a communication session may be assigned a sequence number. The sequence number may be used to reconstruct a desired order of frames of data at the receiving device. By sending the sequence number of the last successful frame before handover, the second satellite 102(2) is able to resume transfer of user data 134 where the transfer stopped when the first satellite 102(1) discontinue providing communication service, without unnecessarily duplicative transmission of previously sent user data 134. By eliminating or reducing duplicative transmission, additional resources are available for sending user data 134 or other information, improving overall efficiency of the system 100.

With regard to FIG. 1, an uplink is a communication link which allows data to be sent to a satellite 102 from a gateway 130, UT 132, or device other than another satellite 102. Uplinks are designated as UL1, UL2, UL3 and so forth. For example, UL1 is a first uplink from the gateway 130 to the second satellite 102(2). In comparison, a downlink is a communication link which allows data to be sent from the satellite 102 to a gateway 130, UT 132, or device other than another satellite 102. For example, DL1 is a first downlink from the second satellite 102(2) to the gateway 103. As mentioned previously, a crosslink 190 provides for communication between satellites 102 in the constellation.

In some implementations, one or more functions of the network management system 150 may be provide by one or more satellites 102. For example, the tracking module 180 of the UT 132 may determine that the first satellite 102(1) will be moving out of range, and determine the second satellite 102(2) based at least in part on the almanac data 182. The UT 132 may send to the first satellite 102(1) a request for a handoff to the second satellite 102(2). The first satellite 102(1) may generate the handover data 164 and send the handover data 164 using the crosslink 190 to the second satellite 102(2). The second satellite 102(2) may then generate the grant data 166. The grant data 166 would then be sent to the first satellite 102(1) using the crosslink 190, and then sent from the first satellite 102(1) to the UT 132.

Figure 2:
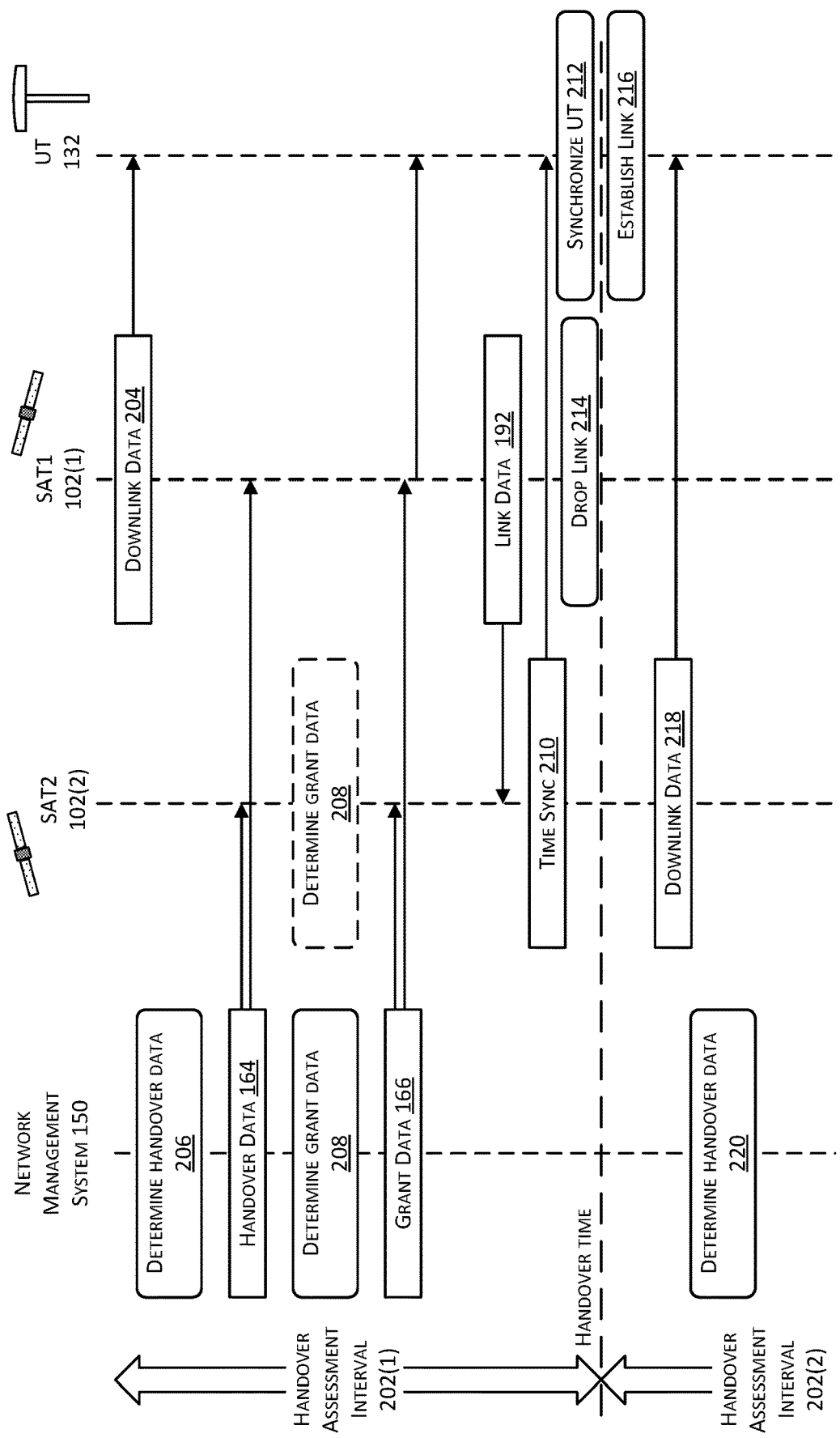
FIG. 2 illustrates a process of providing a low latency handover of satellite communication services, according to some implementations.

FIG. 2 illustrates a process 200 of providing a low latency handover of satellite communication services, according to some implementations. In this illustration, time generally increases from top to bottom. For example, an operation depicted at the top of the page may occur before an operation depicted at the bottom of the page.

In this illustration, the network management system 150, the first satellite 102(1), the second satellite 102(2), and the UT 132 are shown. The gateway(s) 130 and other elements are omitted from this illustration for clarity, and not as a limitation.

While the system 100 is operating, the network management system 150 determines and sends handover data 164 during handover assessment intervals 202. For example, each handover assessment interval 202 may be five seconds long. In other implementations, other durations of handover assessment interval 202 may be used. The handover assessment interval 202 determines the handover data 164 for the next handover assessment interval 202. For example, during a first handover assessment interval 202(1), the network management system 150 determines the handover data 164 used to handle the handover occurring at the start of the second handover assessment interval 202(2).

At 204, during the first handover assessment interval 202(1), communication services are being provided by the first satellite 102(1) to the UT 132. For example, downlink data 204 comprising information addressed to the UT 132 is being transmitted from the first satellite 102(1) to the UT 132. The downlink data 204 may continue to be sent from the first satellite 102(1) until the drop link 214 occurs, as described below. Meanwhile, the rest of the process described herein may continue contemporaneously. Uplink data may also be sent from the UT 132 to the first satellite 102(1). Uplink data is omitted from this figure for clarity.

At 206, the network management system 150 determines the handover data 164 and sends that handover data 164 to the first satellite 102(1) and the second satellite 102(2). For example, based at least on the orbital data 156 and the user terminal data 160, handover data 164 is determined that indicates that the second satellite 102(2) will take over providing communication services to the UT 132 at the handover time. In other implementations, the network management system 150 may use other data to determine the handover data 164. For example, UTs 132 may be grouped by geographic regions, such as grid squares, and each grid square may be designated for handover to a particular satellite 102. In another example, the handover data 164 may be determined based on the orbital data 156. For example, a particular volume above the earth may be designated in advance. UTs 132 may be associated with that volume. The determination of the second satellite 102(2) to provide communication services may be determined based on the motion of the second satellite 102(2) moving through that particular volume. In this way, the determination of the handover data 164 may be determined with only coarse geolocation data.

Based on the handover data 164, at 208 the grant data 166 is determined. The determination of the grant data 166 may be performed by one or more of the network management system 150, the second satellite 102(2), or another device. For example, the second satellite 102(2) may receive the handover data 164. The onboard resource scheduler 106 may then use the handover data 164 to determine which satellite resources are expected to be available during the upcoming second handover assessment interval 202(2), and generate the grant data 166.

In the implementations where the grant data 166 is generated by a device other than the second satellite 102(2), the grant data 166 may be sent to the second satellite 102(2). The grant data 166 is also sent to the UT 132. For example, the grant data 166 may be sent via the crosslink 190 to the first satellite 102(1) that is currently providing communication services to the UT 132. The first satellite 102(1) may send the grant data 166 to the UT 132.

At this point, based on the grant data 166, the second satellite 102(2) knows in advance of the start of the second handover assessment interval 202(2) what the parameters will be for communicating with the UT 132. Likewise, the UT 132 knows in advance that it will be communicating with the second satellite 102(2), and the parameters of that communication.

As the handover time approaches, the first satellite 102(1) sends the link data 192 to one or more of the second satellite 102(2), the gateway 130, or other devices. For example, the link data 192 may inform those devices as to the sequence number of the last successfully transmitted frame. This link data 192 is then used to determine which data is to be sent from the gateway 130 to the second satellite 102(2), or which data is to be sent from the second satellite 102(2) to the UT 132. By using the link data 192, duplicative transmission is reduced or eliminated.

Meanwhile, the second satellite 102(2) sends a time synchronization signal 210. The time synchronization signal 210 may be addressed to a specific device, such as a particular UT 132, or may be broadcast to multiple devices.

At 212, the first UT 132 receives the time synchronization signal 210 and may synchronize the clock 152 onboard the UT 132 to the time synchronization signal 210. In some implementations, information such as the time of flight correction 186 may be used to determine a corrected time that takes into consideration time of flight of the time synchronization signal 210, relativistic effects, and so forth.

At 214, the first satellite 102(1) discontinues communication service with the UT 132. For example, the link module 104 onboard the first satellite 102(1) drops the communication link to the UT 132. By this time, the downlink data 204 from the first satellite 102(1) to the UT 132 has ceased.

At 216, based on the grant data 166, the second satellite 102(2) establishes communication service with the UT 132. Because the UT 132 and the second satellite 102(2) had the grant data 166 in advance, they are ready to establish the link and begin communication with a minimal handshake or other interchange. This substantially reduces the latency of the handover time.

With the link between the second satellite 102(2) and the UT 132 established, at 218 transfer of user data 134 may resume, now using the second satellite 102(2) to relay data to the gateway 130. Uplink data may also be sent from the UT 132 to the second satellite 102(2). Uplink data is omitted from this figure for clarity.

Meanwhile at 220, the network management system 150 determines the handover data 164 for the next handover assessment interval 202. The process may continue on, determining in advance the handover data 164 and corresponding grant data 166 in advance of the next handover.

By using the system 100 as described, overall reliability and throughput of the system 100 is substantially improved. Latency in the transfer of user data 134 due to the handover is substantially reduced. The process also substantially reduces the delays associated with, and the consumption of resources at, one or more of the satellites 102, at the gateways 130, or the network management system 150 of techniques that rely on communication link metrics to determine when and how to handover communication services to another satellite 102. Instead of attempting to determine when a link becomes marginal and then performing the handover, the handover is determined in advance. The system 100 also significantly reduces the inter-satellite traffic that would otherwise be associated with multiple satellites 102 attempting to resolve which satellite 102 should take on responsibility for providing communication service.

Figure 3:
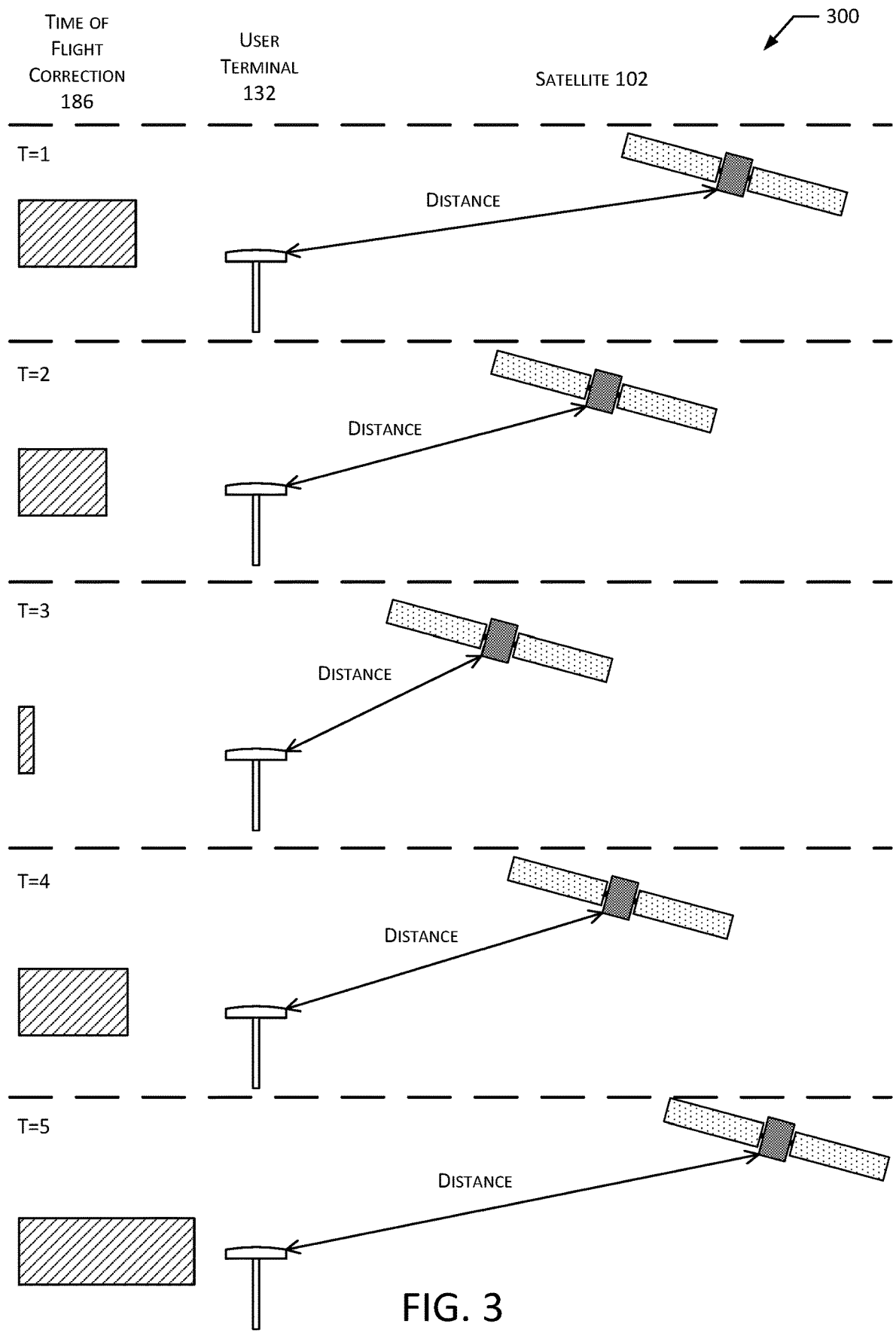
FIG. 3 illustrates the time of flight correction used by the user terminal to provide time-synchronized signals to a satellite, according to some implementations.

FIG. 3 illustrates the time of flight correction 186 used by the UT 132 to provide time-synchronized signals to a satellite 102, according to some implementations. In this illustration a bar graph depicting a relative magnitude of a time of flight correction 184 is shown for times t=1, 2, 3, 4, and 5. Also shown is the UT 132 and the satellite 102 that is providing communication services. As time progresses, distance between the satellite 102 and the UT 132 changes due to the relative motion of the satellite 102 with respect to the Earth where the UT 132 is placed. At time t=1 where the distance is relatively large, the time of flight correction 186 is relatively large. As the distance decreases to time t=3, so too does the time of flight correction 186.

The link module 104 of the UT 132 uses the time of flight correction 186 to adjust the timing of when signals are transmitted to the satellite 102. In some implementations the timing of when signals are received from the satellite 102 may also be adjusted based on the time of flight correction 186. In one implementation, the time of flight correction 186 may be used in conjunction with the time synchronization signal 210 and the clock 152 of the UT 132 to coordinate timing between the satellite 102 and the UT 132. For example, a time offset value may be determined based on a difference between a clock 152 on the UT 132 and coordinate to the time synchronization signal 210 and the time of flight correction 186. The time offset value specifies how much the transmit timing of signals to the satellite 102 should be advanced or delayed such that the signals arrive at the satellite within 102 within a threshold interval of a desired time. For example, the UT 132 adjusts when it transmits a signal based on the time offset value and the time synchronization signal 210. A similar operation may be used for receiving signals from the satellite 102.

From the perspective of the satellite 102, the satellite 102 is receiving signals from UTs 132 in which the timing is tightly coordinated to, and synchronized with, the internal clock 152 of the satellite 102. This allows greater utilization of the communication link by reducing the time between transmission of frames, providing more time for transmitting user data 134. By performing the time offset at the UT 132, the processing workload of the satellite 102 is substantially reduced. This reduces the cost and complexity of the satellite 102, reducing overall system cost.

FIG. 4 illustrates data associated with operation of the system 100, according to some implementations. The data may include a parameter 402 and an associated value 404.

The handover data 164 may include parameters 402 and corresponding values 404 for a user terminal identifier, next satellite identifier, handover time, resource priority, and so forth. For example, the UT identifier may comprise a media access control value that indicates a particular UT 132. The next satellite identifier may indicate the serial number or other identifier that denotes a specific satellite 102 in the constellation. The handover time may indicate a particular handover time that the handover data 164 is associated with. The resource priority may indicate the priority to be considered by the resource scheduler 106 when allocating resources for communication services to the associated UT 132.

The grant data 166 may include parameters 402 and corresponding values 404 for the UT identifier, next satellite identifier, the handover time, uplink frequencies, downlink frequencies, timeslot(s), grant expiration time, encoding scheme, and so forth. For example, the uplink frequencies and the downlink frequencies may vary due to other users, orientation of the satellite 102, and so forth.

The grant for use of satellite 102 resources may expire. For example, if the link module 104 does not establish communication with the UT 132 within a threshold period of time, the resource scheduler 106 may deallocate the resources associated with the grant data 166. For example, if no signal is received from the UT 132 within the threshold period of time after the handover time, the second satellite 102(2) may deallocate the communication resources previously allocated for use by the UT 132. This deallocation may free up those resources to be used for other functions, reduce power consumption and so forth. For example, the deallocation may result in the satellite 102 discontinuing tracking the UT 132 with a spot beam.

The tracking data 186 may include parameters 402 and corresponding values 404 for the current location (geolocation) of the UT 132, the handover time, azimuth and elevation, time of flight correction 186, and so forth. For example, the current location may be determined using output from a global position system (GPS) receiver, manual input, and so forth. In some implementations, prior to the handover time, initial azimuth and elevation may be determined, initial time of flight correction 186, and so forth. This allows the UT 132 to quickly establish communication with the second satellite 102(2) at the designated handover time.

The link data 192 may include parameters 402 and corresponding values 404 for the UT identifier, last sequence number, and so forth. For example, if the system 100 uses transmission control protocol (TCP), each frame of data is assigned a sequence number. The last sequence number may comprise the sequence number of the last frame transmitted by the first satellite 102(1) immediately before the handover. In some implementations this may be the last frame that has been confirmed to have been received successfully, such as by reception of an acknowledgement or "ACK" from the link module 104 of the UT 132.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a first satellite in a non-geosynchronous orbit;
a second satellite in a non-geosynchronous orbit;
a first user terminal (UT) that is in communication with the first satellite at a first time; and
a network management system to, during a first interval that includes the first time:
determine the first UT is to be provided with communication service at a second time;
determine a first geolocation of the first UT;
determine orbital data indicative of motion of the first satellite and the second satellite;
determine, based on the first geolocation and the orbital data, handover data associated with the second time that is indicative of:
the first UT,
the second satellite, and
a handover time indicative of a time at which the first UT is scheduled to:
discontinue communication with the first satellite, and
establish communication with the second satellite;
send the handover data to the first satellite and the second satellite;
determine grant data that is indicative of:
the first UT,
the second satellite,
the handover time, and
one or more of:
an uplink frequency,
a downlink frequency, or
a timeslot; and
send the grant data to:
the first UT, and
the second satellite.

2. The system of claim 1, the network management system to further:
determine first data indicative of:
the first UT transferring data using the first satellite,
operation of the first satellite,
operation of the second satellite, and
availability of at least one gateway; and
wherein the determination of the handover data is further based on the first data.

3. The system of claim 1, the first UT to:
determine the first geolocation of the first UT;
receive the grant data;
determine almanac data indicative of motion of the second satellite;
determine, based on the grant data and the almanac data, a time of flight correction indicative of a time for a signal to travel from the first UT to an estimated location of the second satellite at a third time;
receive a time synchronization signal from the second satellite;
determine a time offset value based on a difference between the time of flight correction and the time synchronization signal;
determine a fourth time based on the third time and the time offset value; and
send a first signal to the second satellite at the fourth time.

4. The system of claim 1, the first satellite to:
determine a sequence number associated with a last frame of data successfully transmitted from the first satellite to the first UT before the handover time; and
send the sequence number to the second satellite before the handover time.

5. The system of claim 1, the first UT to:
receive the grant data;
determine, based on the grant data, a time of flight correction for the second satellite that is based at least in part on a distance from the first UT to the second satellite at a specified time;

receive a time synchronization signal from the second satellite; and send, at a third time that is based at least in part on the time synchronization signal and the time of flight correction, a signal to the second satellite to confirm communication service is to be provided to the first UT.

6. The system of claim 1, the second satellite to:

based at least in part on the grant data, allocate communication resources for use by the first UT beginning at the handover time;

determine, at a third time that is after the handover time, that no signal has been received from the first UT; and deallocate the communication resources.

7. A method comprising:

determining that a first satellite is in communication with a first user terminal (UT) at a first time;

determining a first geolocation of the first UT;

determining orbital data indicative of motion of the first satellite and a second satellite, the first satellite and the second satellite being part of a network of satellites;

determining, based on the first geolocation and the orbital data, handover data that is indicative of:
  the first UT,
  the second satellite, and
  a handover time at which the first UT is scheduled to:
    discontinue communication with the first satellite; and
    establish communication with the second satellite;

sending the handover data to the first satellite and the second satellite;

determining grant data indicative of:
  the first UT,
  the second satellite,
  the handover time, and
  one or more of:
    an uplink frequency,
    a downlink frequency, or
    a timeslot; and sending the grant data to:
  the first UT, and
  a link module of the second satellite.

8. The method of claim 7, further comprising:

discontinuing, before the handover time, communication between the first satellite and the first UT; and establishing communication between the second satellite and the first UT at the handover time.

9. The method of claim 7, further comprising:

determining first data indicative of:
  operation of the first UT,
  operation of the first satellite,
  operation of the second satellite, and
  operation of at least one gateway; and wherein determining the handover data is further based on the first data.

10. The method of claim 7, further comprising:

responsive to receiving the handover data, determining the grant data using a resource scheduler of the second satellite.

11. The method of claim 7, further comprising:

determining first data indicative of motion of the second satellite;

determining, based on the grant data and the first data, a time of flight correction indicative of a time for a signal to travel from the first UT to an estimated location of the second satellite at a third time;

receiving, at the first UT, a time synchronization signal from the second satellite;

determining, based on the time of flight correction and the time synchronization signal, a time offset value;

determining a fourth time based on the third time and the time offset value; and sending, from the first UT to the second satellite at the fourth time, a first signal.

12. The method of claim 7, further comprising:

determining link data indicative of last data transmitted before the handover time from the first satellite to the first UT; and sending the link data to the second satellite.

13. The method of claim 7, further comprising:

sending, by the second satellite at the handover time, a time synchronization signal;

determining, by the first UT, a time of flight correction;

determining a third time based at least in part on the time synchronization signal and the time of flight correction; and sending data from the first UT to the second satellite at the third time.

14. The method of claim 7, further comprising:

responsive to the grant data, allocating communication resources for use by the first UT beginning at the handover time;

determining, at a third time that is after the handover time, that no signal has been received by the second satellite from the first UT; and deallocating the communication resources.

15. A system comprising one or more computing devices to:

determine that a first satellite is in communication with a first user terminal (UT) at a first time;

determine a first geolocation of the first UT;

determine orbital data indicative of motion of the first satellite and a second satellite;

determine, based on the first geolocation and the orbital data, handover data that is indicative of:
  the first UT,
  the second satellite, and
  a handover time at which the first UT is scheduled to:
    discontinue communication with the first satellite; and
    establish communication with the second satellite;

send the handover data to the first satellite and the second satellite;

determine grant data indicative of:
  the first UT,
  the second satellite,
  the handover time, and
  one or more of:
    an uplink frequency,
    a downlink frequency, or
    a timeslot; and send the grant data to:
  the first UT, and
  a link module of the second satellite.

16. The system of claim 15, the one or more computing devices further to:

determine, using a resource scheduler of the second satellite, the grant data responsive to the handover data.

17. The system of claim 15, the one or more computing devices further to:

determine first data indicative of motion of the second satellite;

determine, based on the grant data and the first data, a time of flight correction indicative of a time for a signal to travel from the first UT to an estimated location of the second satellite at a third time;

receive, at the first UT, a time synchronization signal from the second satellite;

determine, based on the time of flight correction and the time synchronization signal, a time offset value;

determine a fourth time based on the third time and the time offset value; and send, from the first UT to the second satellite at the fourth time, a first signal.

18. The system of claim 15, the one or more computing devices further to:

determine link data indicative of last data transmitted before the handover time from the first satellite to the first UT; and send the link data to the second satellite.

19. The system of claim 15, the one or more computing devices further to:

send, by the second satellite at the handover time, a time synchronization signal;

determine, by the first UT, a time of flight correction;

determine a third time based at least in part on the time synchronization signal and the time of flight correction; and send data from the first UT to the second satellite at the third time.

20. The system of claim 15, the one or more computing devices further to:

responsive to the grant data, allocate communication resources for use by the first UT beginning at the handover time;

determine, at a third time that is after the handover time, that no signal has been received by the second satellite from the first UT; and deallocate the communication resources.

* * * * *